(12) United States Patent
Yeh (10) Patent No.: US 8,335,079 B2
(45) Date of Patent: Dec. 18, 2012

(54) HANDHELD ELECTRONIC DEVICE

(75) Inventor: Chih-Shan Yeh, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 299 days.

(21) Appl. No.: 12/905,084

(22) Filed: Oct. 15, 2010

(65) Prior Publication Data

US 2011/0110548 A1    May 12, 2011

(30) Foreign Application Priority Data

Nov. 11, 2009 (TW) ................................ 98138270 A (51) Int. Cl.
*H05K 5/00* (2006.01)
*H05K 7/00* (2006.01)
(52) U.S. Cl. ............ 361/679.56; 361/679.3; 361/679.55; 455/575.1; 455/575.4; 345/156; 345/169; 345/905
(58) Field of Classification Search ............... 361/679.3, 361/679.55, 679.56; 455/575.1, 575.4; 345/156, 345/169, 905
See application file for complete search history.

(56) References Cited

U.S. PATENT DOCUMENTS

| 7,353,053 | B2 * | 4/2008 | Prichard et al. | 455/575.4 |
| 7,636,590 | B2 * | 12/2009 | Shin | 455/575.1 |
| 7,925,312 | B2 * | 4/2011 | Takagi et al. | 455/575.1 |
| 8,111,512 | B2 * | 2/2012 | Yeh et al. | 361/679.59 |
| 2008/0180892 | A1 * | 7/2008 | Lai | 361/680 |
| 2009/0093285 | A1 * | 4/2009 | Weng et al. | 455/575.4 |
| 2009/0131127 | A1 * | 5/2009 | Hung | 455/575.4 |

FOREIGN PATENT DOCUMENTS

| TW | I280772 | 5/2007 |
| TW | 200743345 | 11/2007 |
| TW | 200917929 | 4/2009 |

OTHER PUBLICATIONS

"Office Action of Taiwan Counterpart Application", issued on Nov. 16, 2011, p. 1-p. 6, in which the listed references were cited.

* cited by examiner

*Primary Examiner* — Anthony Haughton
(74) *Attorney, Agent, or Firm* — Jianq Chyun IP Office (57) ABSTRACT

A handheld electronic device including a first body, a second body, a stand and a gear set is provided. The first body has a first rack. The second body is slidably coupled with the first body. The stand having a second rack is slidably coupled with the first body and located between the first body and the second body. The gear set has a first engaging portion and a second engaging portion and is pivoted on the second body. The first and second engaging portions are engaged with the first and second racks respectively. When the first body is shifted a first distance with respect to the second body, the first body drives the gear set to rotate by the first rack, and the gear set drives the stand to be shifted a second distance greater than the first distance with respect to the second body by the second rack.

8 Claims, 10 Drawing Sheets

HANDHELD ELECTRONIC DEVICE

CROSS-REFERENCE TO RELATED APPLICATION

This application claims the priority benefit of Taiwan application serial no. 98138270, filed on Nov. 11, 2009. The entirety of the above-mentioned patent application is hereby incorporated by reference herein and made a part of this specification.

BACKGROUND OF THE INVENTION

1. Field of the Invention

The present application relates to a handheld electronic device and more particularly, to a handheld electronic device with standing function.

2. Description of Related Art

A handheld electronic device is an electronic device which a user can carry around and operate on. The handheld electronic device is usually small and light for the user to carry around. The common handheld electronic device is, for example, a mobile phone, a multimedia player, a personal digital assistant (PDA), a handheld game console, a handheld global positioning system, and a notebook.

The conventional handheld electronic devices on the market are provided without props or stands. Therefore, an accessory tool such as a compatible dock is required to stand the handheld electronic device on a table for a user to watch movies displayed on the handheld electronic device. However, there costs the user extra expense to buy the dock and accomplish the standing function for the electronic device. In addition, the dock is inappropriate to be carried around, and thus the accomplishment of standing function performed by the dock is restricted in certain situations. Furthermore, it is inconvenient for the user to hold the handheld electronic device by hands.

SUMMARY OF THE INVENTION

The application provides a handheld electronic device capable of accomplishing standing function without accessory tools or being held by hands of users.

As embodied and broadly described herein, the application provides a handheld electronic device including a first body, a second body, a stand, and a gear set. The first body has a first rack. The second body is slidably coupled with the first body. The foot is slidably disposed between the first body and the second body. The stand has a second rack. The gear set is pivoted on the second body along a rotation axis and provided with a first engaging portion and a second engaging portion. The first engaging portion is engaged with the first rack, while the second engaging portion is engaged with the second rack. When the first body is shifted a first distance with respect to the second body along an operating direction, the first body drives the gear set to rotate by the first rack, and the gear set drives the stand to be shifted a second distance greater than the first distance with respect to the second body along the operating direction by the second rack.

As to the above, in using the handheld electronic device, users can slide the first body with respect to the second body along the operating direction, wherein the stand can be driven by the first rack, the second rack and the gear set to be exposed by the second body and pivots away from the first body. Therefore, the handheld electronic device of the present application can stand on a carrying surface with the stand, by which no handheld or accessory tool is required for a user to watch movies or listen music on the handheld electronic device.

In order to make the aforementioned and other features and advantages of the invention more comprehensible, embodiments accompanying figures are described in detail below.

DESCRIPTION OF EMBODIMENTS

Figure 1A:
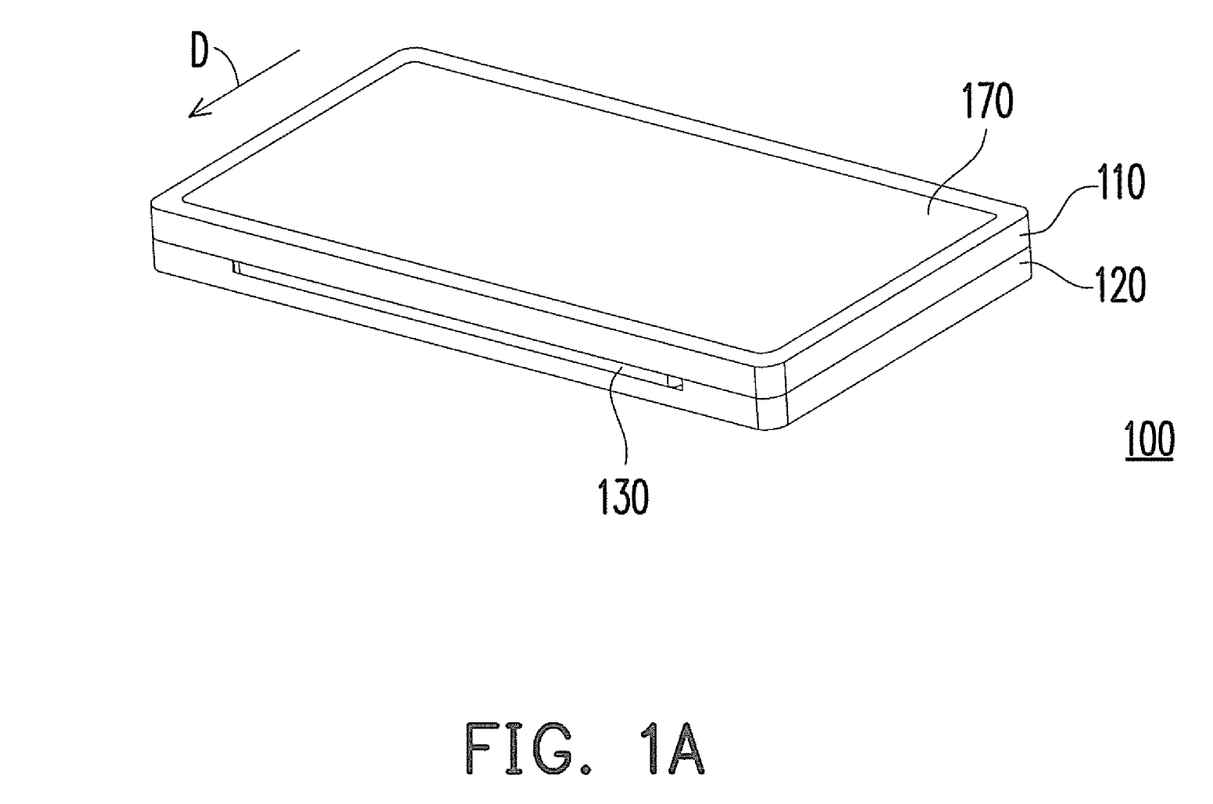
FIGS. 1A through 1C shows a operating process for accomplishing a standing function of a handheld electronic device according to one embodiment of the application.
Figure 1B:
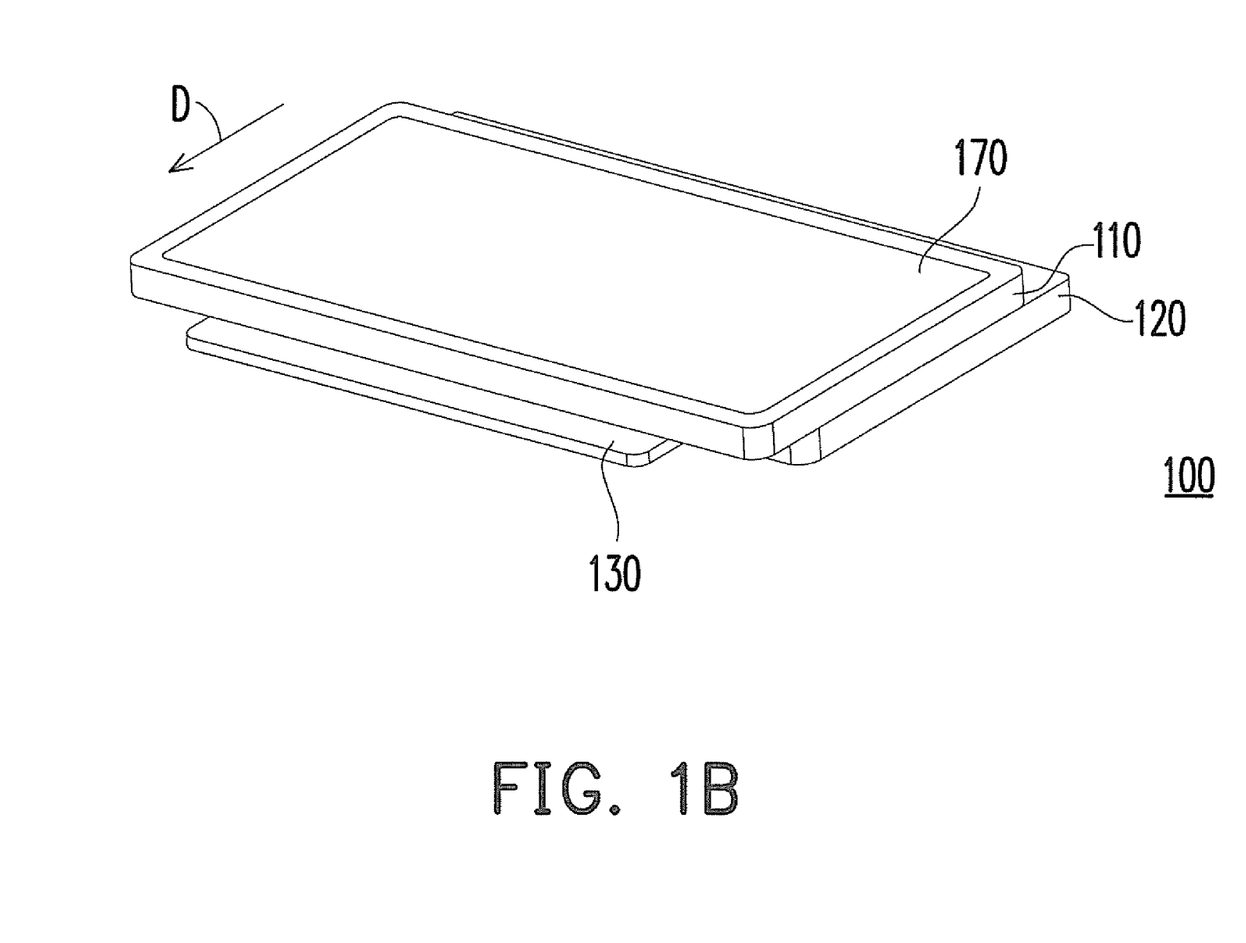
Figure 1C:
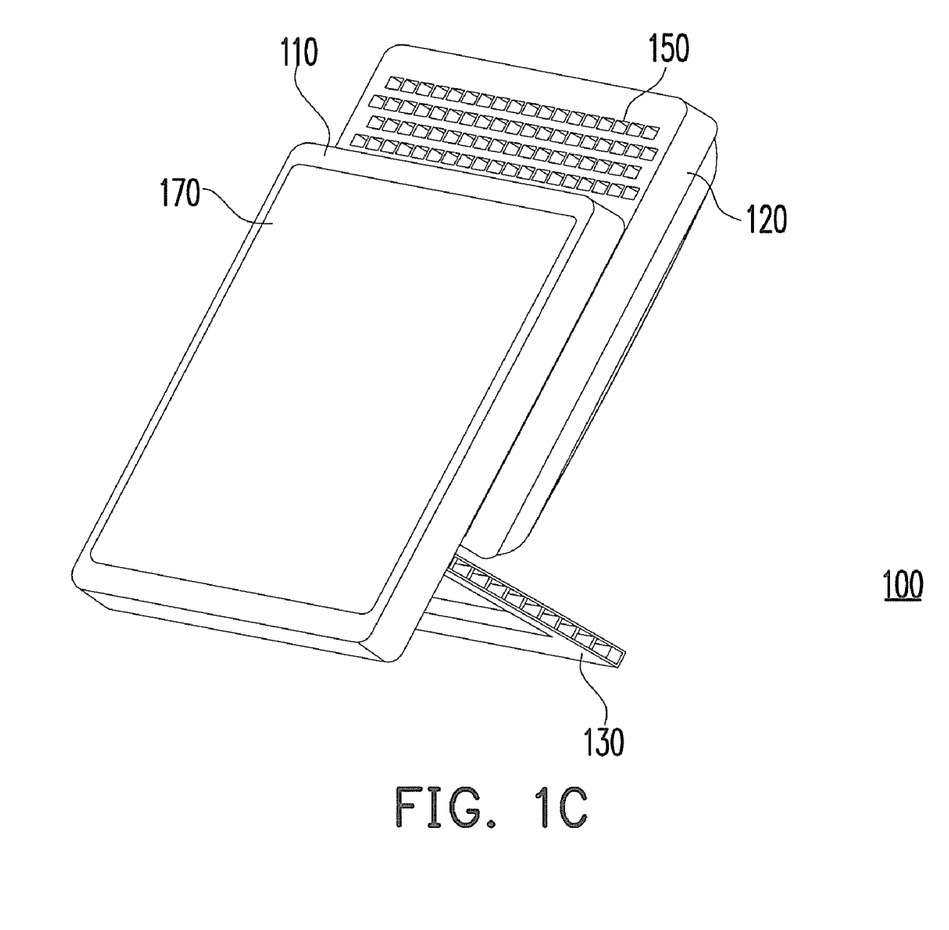

FIGS. 1A through 1C shows an operating process for accomplishing a standing function of a handheld electronic device according to one embodiment of the application. Referring to FIG. 1A, the handheld electronic device 100 of the present embodiment includes a first body 110 and a second body 120. The second body 120 is slidably coupled with the first body 110. Herein, the handheld electronic device 100 is, for example, a slide type mobile phone, a slide type PDA, a slide type multimedia player, or other slide type handheld electronic devices.

In the embodiment, the first body 110 of the handheld electronic device 100 is provided with a display 170, such as a liquid crystal display. In addition, for accomplishing a multimedia audio-video function, the second body 120 of the handheld electronic device 100 may further be provided with a speaker 150 as shown in FIG. 1C. The speaker 150 is disposed at a side of the second body 120 facing the first body 110, and the display 170 and the second body 120 are respectively located at two opposite sides of the first body 110. The speaker 150 as shown in FIG. 1C can be exposed by the first body 110 as the first body 110 is driven to shift with respect to the second body 120 along an operating direction D. Then, the user can watch the movie displayed by the display 170 and listen the music displayed by the speaker 150 at the same time. On the contrary, when the user does not use the handheld electronic device 100, the first body 110 can be retracted to the original position.

In order to stand the handheld electronic device 100 for the user in using the audio-video function thereof, the present embodiment integrates a built-in stand 130 with the handheld electronic device 100. when the first body 110 and the second body 120 are in the retracting state as shown in FIG. 1A, the stand 130 is retracted in the handheld electronic device 100, while when the first body 110 and the second body 120 slide with respect to each other and configured in the spreading state as shown in FIG. 1B, the stand 130 protrudes outside the handheld electronic device 100. Then, as shown in FIG. 1C, the stand 130 pivots away from the first body 110, and thus the handheld electronic device 100 can stand on a carrying surface with the stand 130 for the user to watch display 170. The operational manner of the handheld electronic device 100 is further elaborated hereinafter together with the drawings.

Figure 2:
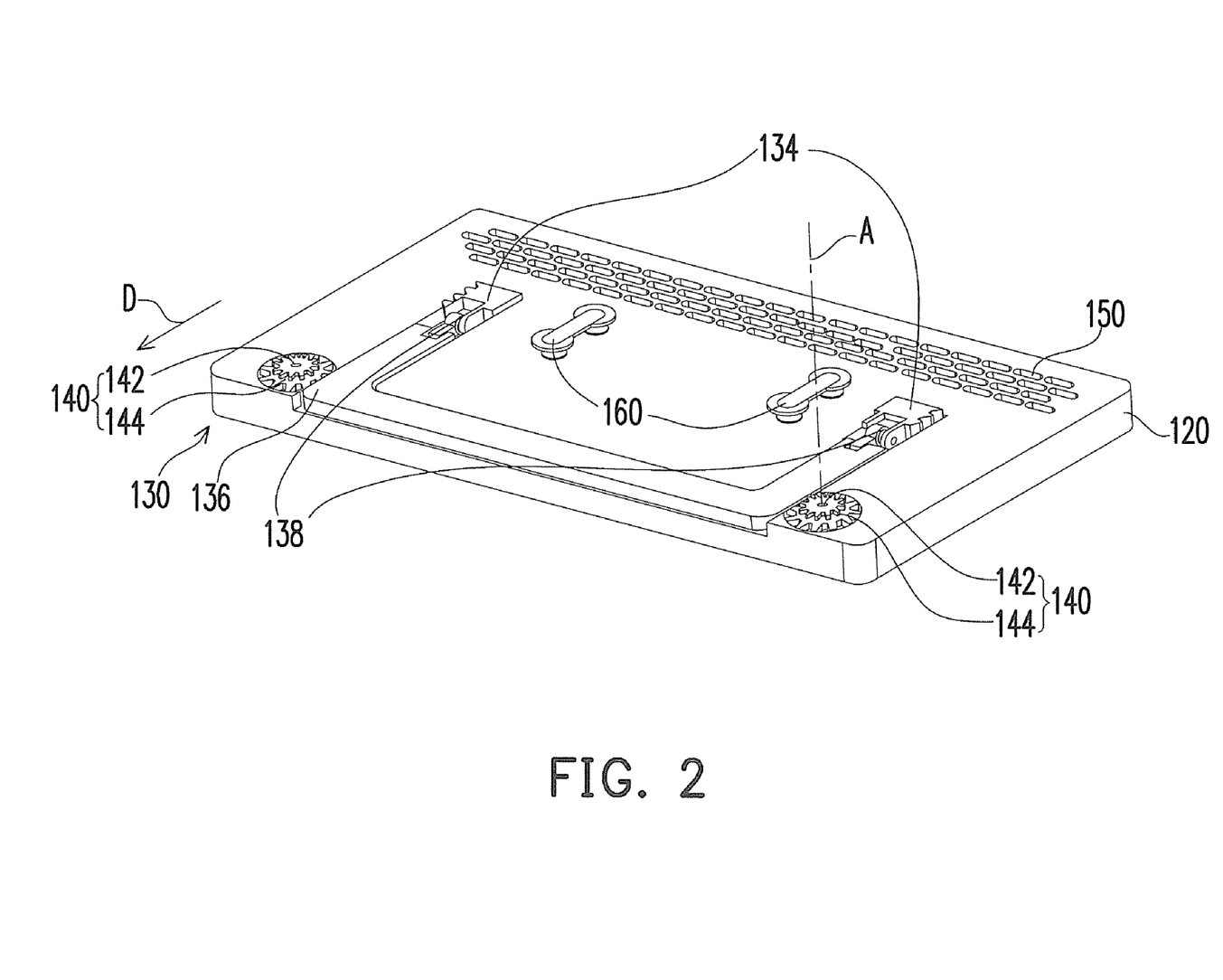
FIG. 2 is a perspective view showing a part of members of the handheld electronic device of FIG. 1A.
Figure 3:
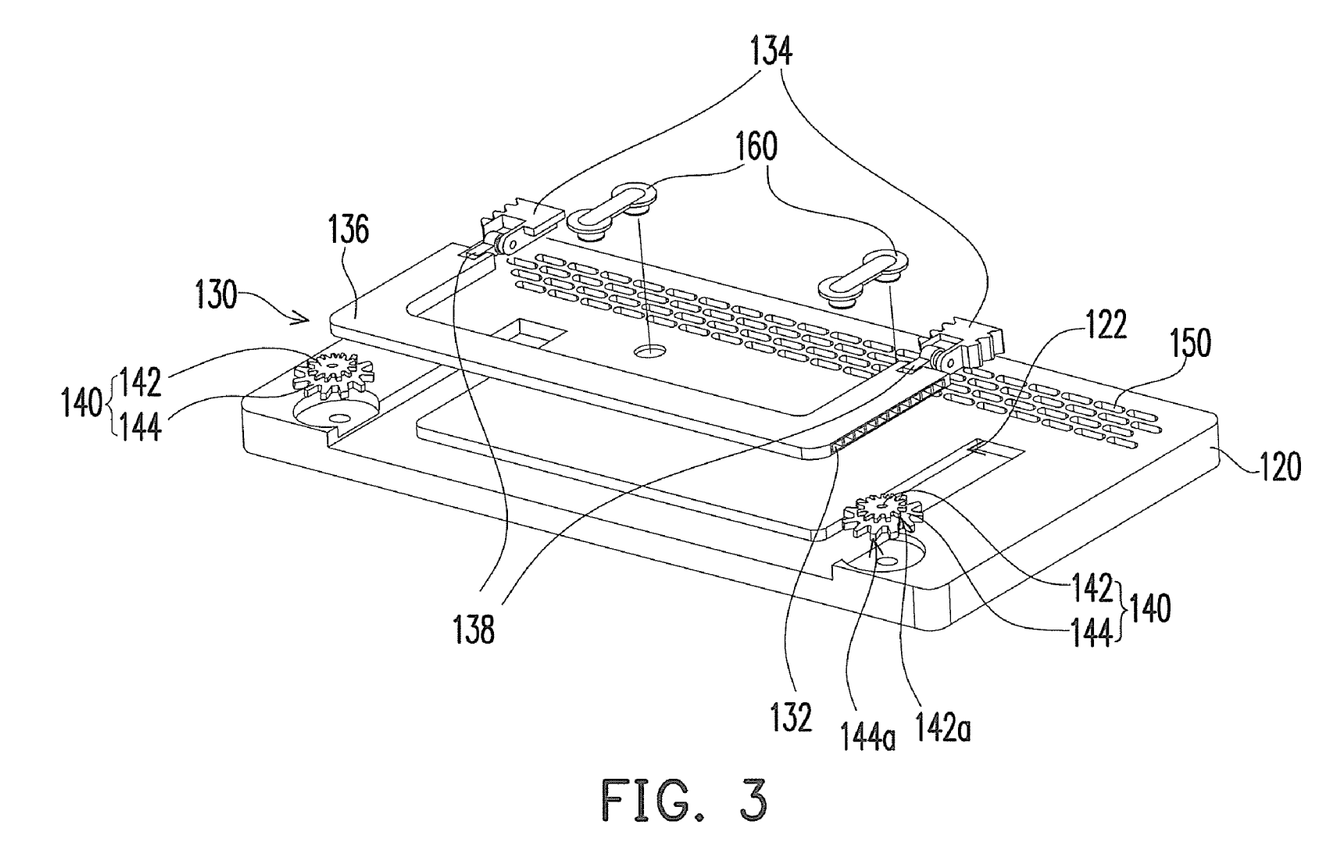
FIG. 3 is an exploded view of the structure as shown in FIG. 2.

FIG. 2 is another perspective view showing a part of members of the handheld electronic device of FIG. 1A. FIG. 3 is an exploded view of the structure as shown in FIG. 2. For better illustration, the first body 110 of FIG. 1A is not depicted in FIGS. 2 and 3. Referring to FIGS. 2 and 3, the stand 130 of the present embodiment has a rack 132 and the stand 130 is slidably coupled with a slot 122 of the second body 120. The handheld electronic device 100 further includes a gear set 140. Each of the gear sets 140 includes a first gear 142 and a second gear 144, wherein the first gear 142 has a first engaging portion 142a, and the second gear 144 ahs a second engaging portion 144a. The second gear 144 is fixed with the first gear 142 and pivoted on the second body 120 along an rotation axis A passing through a rotation center of the first gear 142 and a rotation center of the second gear 144. The second engaging portion 144a is engaged with the rack 132.

Figure 4:
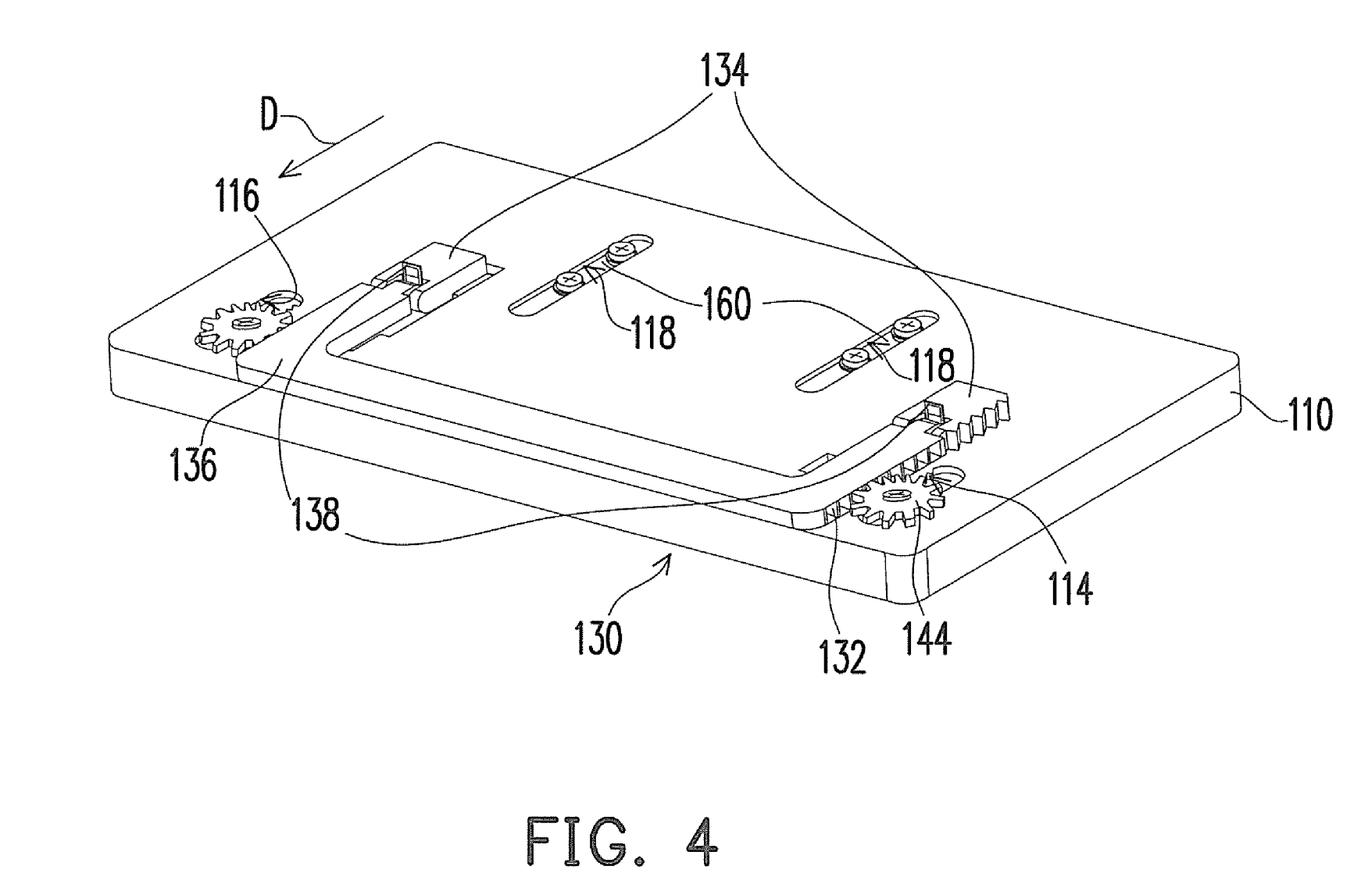
FIG. 4 is another perspective view showing a part of members of the handheld electronic device of FIG. 1A.
Figure 5:
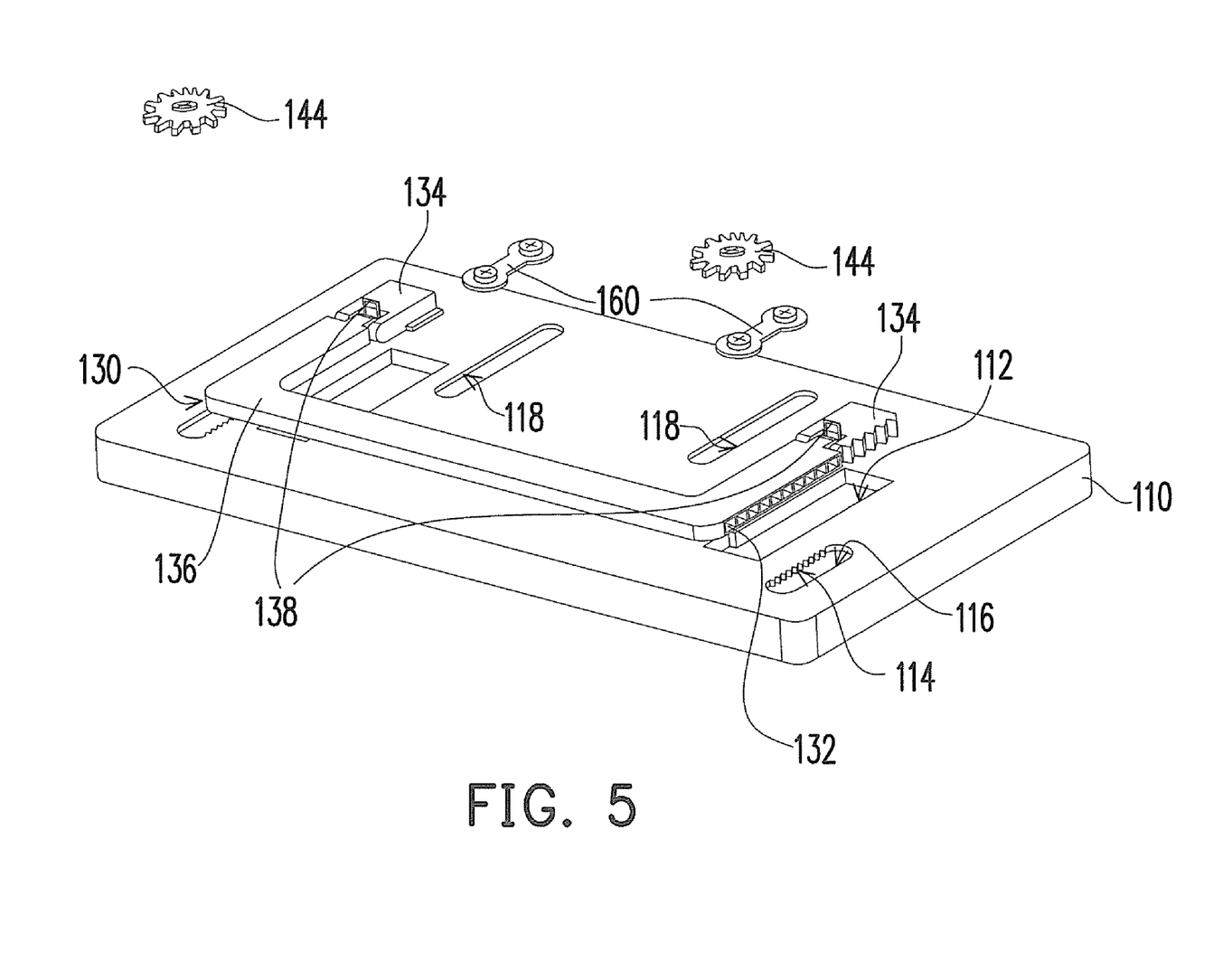
FIG. 5 is an exploded view of the structure as shown in FIG. 4.

FIG. 4 is another perspective view showing a part of members of the handheld electronic device of FIG. 1A. FIG. 5 is an exploded view of the structure as shown in FIG. 4. For better illustration, the second body 120 of FIG. 1A is not depicted in FIGS. 4 and 5. Referring to FIGS. 4 and 5, the first body 110 has a rack 114, and the first engaging portion 142a as shown in FIG. 3 is engaged with the rack 114. The stand 130 is slidably coupled with not only the slot 122 of the second body 120 as shown in FIG. 3, but also a slot 112 of the first body 110. In other words, the slot 112 of the first body 110 is corresponding to the slot 122 of the second body 120, and the stand 130 can be slidably disposed between the first body 110 and the second body 120 through the first slot 112 and the second slot 122.

The first body 110 further has a slot 116 substantially parallel to the operating direction D, and the first gear 142 (shown in FIG. 3) is located in the slot 116. The rack 114 is disposed on the inner wall of the slot 116 and engaged with the first gear 142. In addition, both of the rack 114 and the rack 132 are located at the same side of the gear set 140. Thereby, when the first body 110 slides with respect to the second body 120 along the operating direction D and drives the gear set 140, the stand 130 can be driven by the gear set 140 to shift with respect to the first body 110 and the second body 120 along the same operating direction D. Furthermore, in the present embodiment, the first body 110 is slidably coupled with the second body 120 through the members 160 as shown in FIGS. 2 through 5, wherein each of the members 160 is fixed with the second body 120 and slidably coupled with a slot 118 of the first body 110.

Figure 6:
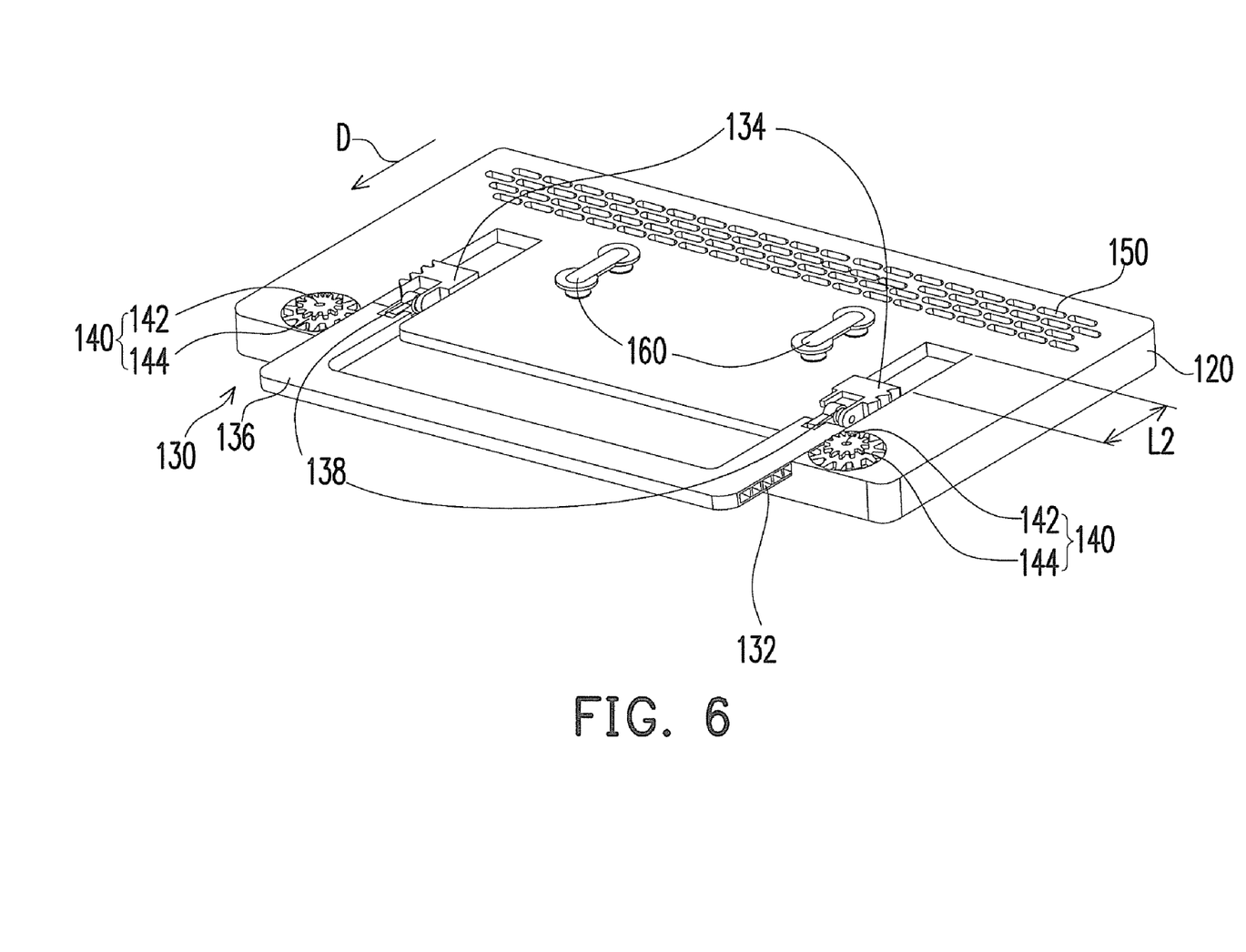
FIG. 6 is a perspective view showing a part of members of the handheld electronic device of FIG. 1B.
Figure 7:
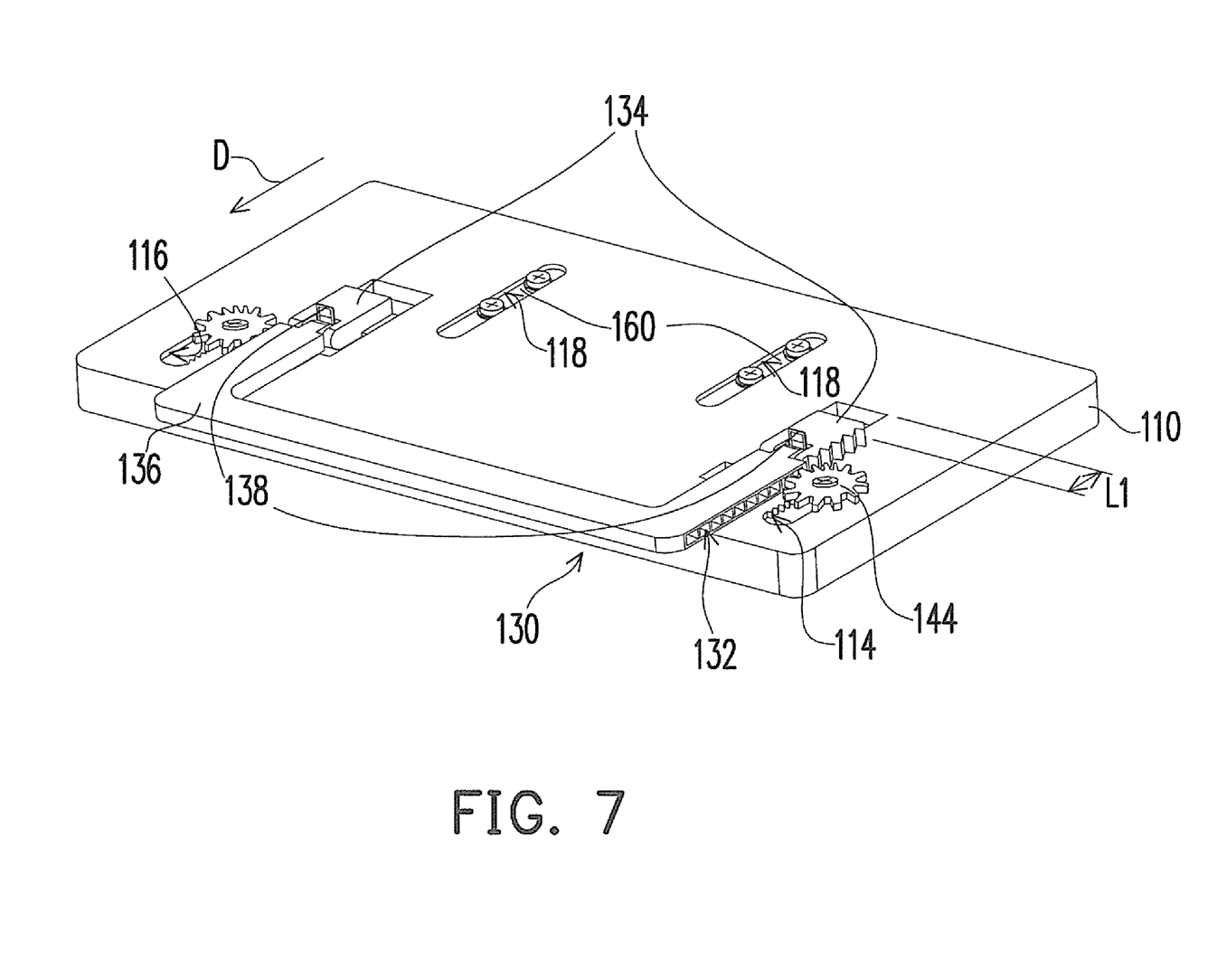
FIG. 7 is another perspective view showing a part of members of the handheld electronic device of FIG. 1B.

FIG. 6 is a perspective view showing a part of members of the handheld electronic device of FIG. 1B. FIG. 7 is another perspective view showing a part of members of the handheld electronic device of FIG. 1B. For better illustration, the first body 110 of FIG. 1B is not depicted in FIG. 6, and the second body 120 of FIG. 1B is not depicted in FIG. 7. When the first body 110 slides with respect to the second body 120 and moves to the position as shown in FIG. 1B, the first body 110 drives the gear set 140 pivoted on the second body 120 by the engagement between the rack 114 of FIG. 4 and the first gear 142 of FIG. 2. The gear set 140 drives the stand 130 to shift with respect to the first body 110 along the operating direction D to the position as shown in FIGS. 6 and 7 by the engagement between the second gear 144 and the second rack 132, wherein the stand 130 shifts a distance L1 with respect to the first body 110 and shifts L2 with respect to the second body 120. More specifically, different relationship between the distance L1 and the distance L2 can be achieved by changing the gear ratio of the first gear 142 and the second gear 144 to meet various design requirements.

Figure 8:
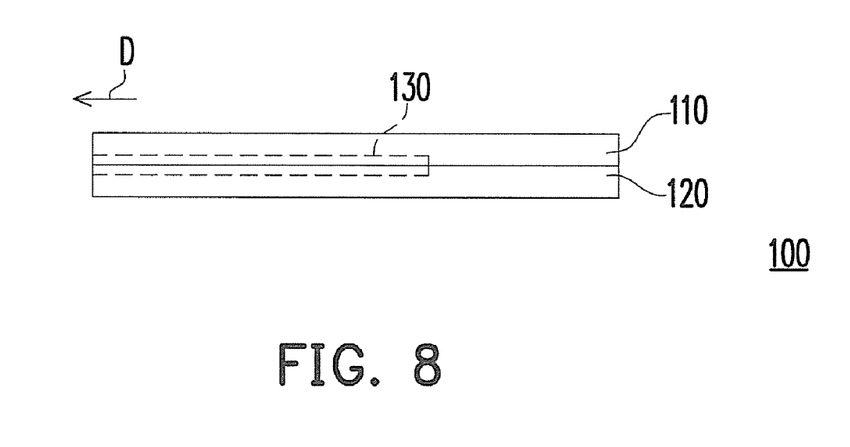
FIG. 8 is a side view of the handheld electronic device of FIG. 1A.
Figure 9:
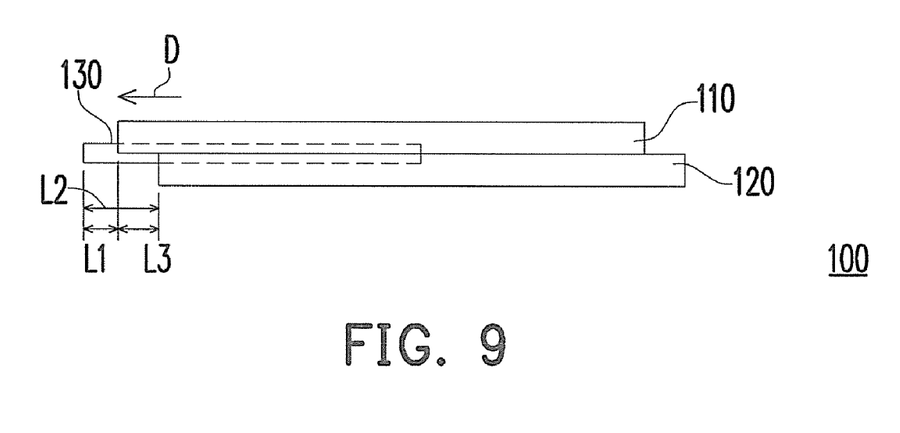
FIG. 9 is a side view of the handheld electronic device of FIG. 1B.

FIG. 8 is a side view of the handheld electronic device of FIG. 1A. FIG. 9 is a side view of the handheld electronic device of FIG. 1B. By using the first gear 142, the second gear 144, the rack 132 and the rack 114 with particular specifications in the aforementioned operating process, the first body 110 can shift from the position as shown in FIG. 8 to the position as shown in FIG. 9 with respect to the second body 120 along the operating direction D, and then the first body 110 drives the stand 130 to shift the distance L1 with respect to the first body 110 along the operating direction D and shift the distance L2 with respect to the second body 120 along the operating direction D.

Accordingly, the user can operate the handheld electronic device 100 by one hand to slide the first body 110 with respect to the second body 120, protrude the stand 130 outside the handheld electronic device 100, and rotate the stand 130 away from the first body 110 as shown in FIG. 1C, to accomplish the standing function of the handheld electronic device 100. Therefore, the operation is more effort-saving for a user. Furthermore, the handheld electronic device 100 of the present embodiment is featured in that the stand 130 can be retracted (hidden) as the handheld electronic device 100 is idle, or the stand 130 with sufficient length can protrude outside as using the handheld electronic device 100. In the operating process of the present embodiment, the stand 130 shifts the distance L2 with respect to the second body 120, wherein the distance L2 is greater than a distance L3 the first body 110 shifts with respect to the second body 120, such that the stand 130 protruding outside the handheld electronic device 100 has the sufficient length to stably support the handheld electronic device 100 and prevent the handheld electronic device 100 from toppling due to imbalance of weight.

The manner of the stand 130 pivoting with respect to the first body is elaborated hereinafter. Referring to FIGS. 2 through 5, in the present embodiment, the stand 130 comprises a sliding portion 134, a supporting portion 136 and an elastic member 138. The sliding portion 134 is slidably disposed between the first body 110 and the second body 120 through the first slot 112 of the first body 110 and the second slot 122 of the second body 120. The supporting portion 136 is pivoted on the sliding portion 134. The elastic member 138 is connected between the sliding portion 134 and the supporting portion 136 to provide a torque adapted to drive the supporting portion 138 to pivot with respect to the sliding portion 134 away from the first body 110. In the present embodiment, the elastic element 138 is a torsion spring, for example.

When the handheld electronic device 100 is in the retracting state as shown in FIG. 1A, the second body 120 obstructs the elastic force of the elastic member 138 and presses the supporting portion 136 to the first body 110, so as to prevent the supporting portion 136 from pivoting with respect to the sliding portion 134 away from the first body 110. When the first body 110 moves from the position as shown in FIG. 1A to the position as shown in FIG. 1B, the second body 120 presses the supporting portion 136 no more, and the supporting portion 136 can pivot with respect to the sliding portion 134 away from the first body 110 to the position as shown in FIG. 1C by the elastic force provided by the elastic member 138, so as to support the handheld electronic device 100 on a carrying surface. Furthermore, the elastic member 138 can be selectively omitted in the handheld electronic device 100 of the present embodiment. Herein, the supporting portion 138 can be driven manually.

In summary, in using the handheld electronic device, users can slide the first body relative to the second body along the operating direction, wherein the stand can be driven by the first rack, the second rack and the gear set to be exposed by the second body and pivots away from the first body. Therefore, the handheld electronic device of the present application can stand on a surface with the stand, by which no handheld or accessory tool such as a dock is required for a user to watch movies or listen music on the handheld electronic device. In addition, the stand of the present application can be retracted within the space between the first body and the second body, which facilitates the user to carry around. On the other hand, the stand shifts the distance with respect to the second body, wherein the distance is greater than a distance the first body shifts with respect to the second body, such that the stand protruding outside the handheld electronic device has the sufficient length to stably support the handheld electronic device and prevent the handheld electronic device from toppling due to imbalance of weight.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A handheld electronic device, comprising:
    a first body, having a first rack;
    a second body, slidably coupled with the first body;
    a stand, slidably disposed between the first body and the second body, the stand having a second rack; and
    a gear set, pivoted on the second body along a rotation axis and provided with a first engaging portion and a second engaging portion, wherein the first engaging portion is engaged with the first rack, the second engaging portion is engaged with the second rack, and when the first body is shifted a first distance with respect to the second body along an operating direction, the first body drives the gear set to rotate by the first rack, and the gear set drives the stand to be shifted a second distance greater than the first distance with respect to the second body along the operating direction by the second rack.

2. The handheld electronic device according to claim 1, wherein the gear set comprises:
    a first gear, having the first engaging portion; and
    a second gear, having the second engaging portion, wherein the second gear is fixed with the first gear and pivoted on the second body, and the rotation axis passes through a rotation center of the first gear and a rotation center of the second gear.

3. The handheld electronic device according to claim 2, wherein the first body has a slot, the first gear is located in the slot, and the first rack is disposed on an inner wall of the slot and engaged with the first gear.

4. The handheld electronic device according to claim 3, wherein an extending direction of the slot is substantially parallel to the operating direction.

5. The handheld electronic device according to claim 1, wherein the stand comprises:
    a sliding portion, slidably disposed between the first body and the second body;
    a supporting portion, pivoted on the sliding portion; and
    an elastic member, connected between the sliding portion and the supporting portion to provide a torque adapted to drive the supporting portion to pivot with respect to the sliding portion away from the first body.

6. The handheld electronic device according to claim 1, wherein the first rack and the second rack are both at the same side of the gear set.

7. The handheld electronic device according to claim 1, further comprising a display disposed on the first body, wherein the display and the second body are located at two opposite sides of the first body.

8. The handheld electronic device according to claim 1, further comprising a speaker disposed at a side of the second body facing the first body, wherein when the first body is shifted the first distance with respect to the second body along the operating direction, the first body exposes the speaker.

* * * * *